(12) United States Patent
Murakonda et al.

(10) Patent No.: US 11,392,855 B1
(45) Date of Patent: Jul. 19, 2022

(54) GUI FOR CONFIGURING MACHINE-LEARNING SERVICES

(71) Applicant: STATE FARM MUTUAL AUTOMOBILE INSURANCE COMPANY, Bloomington, IL (US)

(72) Inventors: Sambasiva R. Murakonda, Cumming, GA (US); Theodore Edward Dorner, Sugar Hill, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 301 days.

(21) Appl. No.: 16/402,943

(22) Filed: May 3, 2019

(51) Int. Cl.
  *G06N 20/00* (2019.01)
  *G06F 3/04817* (2022.01)

(52) U.S. Cl.
  CPC ......... *G06N 20/00* (2019.01); *G06F 3/04817* (2013.01)

(58) Field of Classification Search
  CPC ....... G06N 20/00; G06F 16/26; G06F 3/0482; G06F 3/04817; G06T 111/60
  See application file for complete search history.

(56) References Cited

U.S. PATENT DOCUMENTS

| | | | |
|---|---|---|---|
| 7,921,068 B2 | 4/2011 | Guyon et al. | |
| 8,667,385 B1 | 3/2014 | Mui et al. | |
| 9,817,563 B1 | 11/2017 | Stokes et al. | |
| 9,954,879 B1* | 4/2018 | Sadaghiani | G06N 20/00 |
| 10,013,416 B1* | 7/2018 | Bhardwaj | G06F 40/30 |
| 10,262,271 B1* | 4/2019 | Doddi | G06F 3/0484 |
| 2003/0048273 A1 | 3/2003 | Bires | |
| 2007/0240069 A1* | 10/2007 | Eldridge | G05B 19/0426 715/763 |
| 2010/0257136 A1 | 10/2010 | Velozo et al. | |
| 2010/0299629 A1 | 11/2010 | Faist et al. | |
| 2010/0306242 A1* | 12/2010 | Chow | G06F 40/169 707/769 |
| 2012/0005045 A1 | 1/2012 | Baker | |

(Continued)

FOREIGN PATENT DOCUMENTS

| | | |
|---|---|---|
| CN | 107844836 A | 3/2018 |
| CN | 107948254 A | 4/2018 |

OTHER PUBLICATIONS

D. Murphy, "Annotate screenshots with Microsoft's Snip for Windows," published Aug. 28, 2015, downloaded from https://www.pcmag.com/news/annotate-screenshots-with-microsofts-snip-for-windows (Year: 2015).*

(Continued)

*Primary Examiner* — Eric J Yoon
(74) *Attorney, Agent, or Firm* — Lee & Hayes, P.C.

(57) ABSTRACT

A data pipeline tool provides a machine-learning design interface that a user can utilize (e.g., via an electronic device such as a personal computer, tablet, or smart phone) to design or configure data pipelines or workflows defining the manner in which ML models are developed, trained, tested, validated, or deployed. Once deployed, a designed ML model may generate predictive results based on input data fed to the ML model. The tool may present the predictive results via a GUI, and may enable a user to mark-up or otherwise interact with those predictive results. The tool may enable the user to share the results (which may include a mark-up or annotation provided by a user).

18 Claims, 8 Drawing Sheets

(56) References Cited

U.S. PATENT DOCUMENTS

| | | | | |
|---|---|---|---|---|
| 2013/0232407 | A1* | 9/2013 | Onuma | G06F 40/114 715/251 |
| 2013/0332899 | A1* | 12/2013 | Stewart | G06F 9/44505 717/121 |
| 2015/0379072 | A1 | 12/2015 | Dirac et al. | |
| 2016/0057107 | A1* | 2/2016 | Call | H04L 63/0236 726/11 |
| 2016/0092059 | A1 | 3/2016 | Tu et al. | |
| 2016/0132787 | A1 | 5/2016 | Drevo et al. | |
| 2016/0180556 | A1 | 6/2016 | Deng | |
| 2016/0286005 | A1* | 9/2016 | Bruce | H04L 67/42 |
| 2017/0024912 | A1* | 1/2017 | de Castro Alves | G06F 16/24568 |
| 2019/0129906 | A1 | 5/2019 | Keen | |

OTHER PUBLICATIONS

Informatica, "Enterprise Cloud Data Management". Retrieved from the Internet at <https://www.informatica.com/#fbid=3fqlcxG1zpK> Jul. 23, 2019.

Numtra, "Numtra Data Science Platform". Retrieved from the Internet at <https://numtra.com/datascience/> Jul. 23, 2019.

TIBCO, "TIBCO Data Virtualization". Retrieved from the Internet at <https://www.tibco.com/products/data-virtualization> Jul. 23, 2019.

Denodo, "What is Data Virtualization?" Retrieved from the Internet at <https://www.denodo.com/en/data-virtualization/overview> Jul. 23, 2019.

Tableau, "Changing the way you think about data". Retrieved from the Internet at <https://www.tableau.com/> Jul. 23, 2019.

Qlikview, "Lead with data". Retrieved from the Internet at <https://www.qlik.com/us/> Jul. 23, 2019.

Sarpong et al., "A Conceptual Framework for Data Cleaning—A Novel Approach to Support the Cleansing Process" International Journal of Computer Applications, 77:22-26 (2013).

Machine Learning Mastery, "How to Think About Machine Learning". Retrieved from the Internet at <https://machinelearningmastery.com/think-machine-learning/> Jul. 23, 2019.

Towards Data Science, "Metrics to Evaluate your Machine Learning Algorithm". Retrieved from the Internet at <https://towardsdatascience.com/metrics-to-evaluate-your-machine-learning-algorithm-f10ba6e38234> Jul. 23, 2019.

Towards Data Science, "How To Develop a Machine Learning Model From Scratch". Retrieved from the Internet at <https://towardsdatascience.com/machine-learning-general-process-8f1b510bd8af> Jul. 23, 2019.

Data36, "Predictive Analytics 101—Part 2". Retrieved from the Internet at <https://data36.com/predictive-analytics-101-part-2/? Jul. 23, 2019.

Machine Learning Mastery, "Data, Learning and Modeling". Retrieved from the Internet at <https://machinelearningmastery.com/data-learning-and-modeling/> Jul. 23, 2019.

Machine Learning Mastery, "Difference Between Classification and Regression in Machine Learning". Retrieved from the Internet at <https://machinelearningmastery.com/classification-versus-regression-in-machine-learning/> Jul. 23, 2019.

Machine Learning Mastery, "Machine Learning On Slack". Retrieved from the Internet at <https://medium.com/maestral-solutions/machine-learning-on-slack-96a03d9d8b8b> Jul. 23, 2019.

U.S. Appl. No. 16/403,092, GUI for Interacting With Analytics Provided by Machine-Learning Services, filed May 3, 2019.

Office action for U.S. Appl. No. 16/403,092, dated Mar. 4, 2021, Murakonda, "GUI for Interacting With Analytics Provided by Machine-Learning Services", 17 pages.

* cited by examiner

GUI FOR CONFIGURING MACHINE-LEARNING SERVICES

TECHNICAL FIELD

The present disclosure generally relates to techniques for designing and configuring machine-learning services and, more particularly, to a GUI that simplifies the design and configuration.

BACKGROUND

Many machine-learning (ML) models and algorithms require large amounts of data from different sources to be developed, trained, tested, or deployed. This data may be stored in multiple sources according to multiple formats, languages, and configurations, and may be accessible via numerous different protocols and APIs. Often when developing a model, more time is spentidentifying, acquiring, sorting, or filtering the data than in all other tasks combined. Programmers and designers may spend a significant amount of time identifying data sources and writing API requests to input data, finding the appropriate data in the files sent, translating the data into a usable computer language, and storing the data appropriately for developing the model.

SUMMARY

Note, this summary has been provided to introduce a selection of concepts further described below in the detailed description. As explained in the detailed description, certain embodiments may include features and advantages not described in this summary, and certain embodiments may omit one or more features and/or advantages described in this summary.

Described systems and techniques relate to a data pipeline tool that provides a ML design interface that a user may utilize (e.g., via an electronic device such as a personal computer, tablet, or smart phone) to design or configure data pipelines or workflows defining the manner in which ML models are developed, trained, tested, validated, or deployed. Once deployed, the designed ML model may generate predictive results based on input data fed to the ML model. The tool may present the predictive results via a GUI, and may enable the user to mark-up or otherwise interact with those predictive results. For example, the tool may enable the user to share the results (which may include a mark-up or annotation provided by a user). The tool may transmit or otherwise make available the shared results for other devices to access.

BRIEF DESCRIPTION OF THE DRAWINGS

Each of the figures described below depicts one or more aspects of the disclosed system(s) and/or method(s), according to an embodiment. The detailed description refers to reference numerals included in the following figures.

DETAILED DESCRIPTION

Figure 1A:
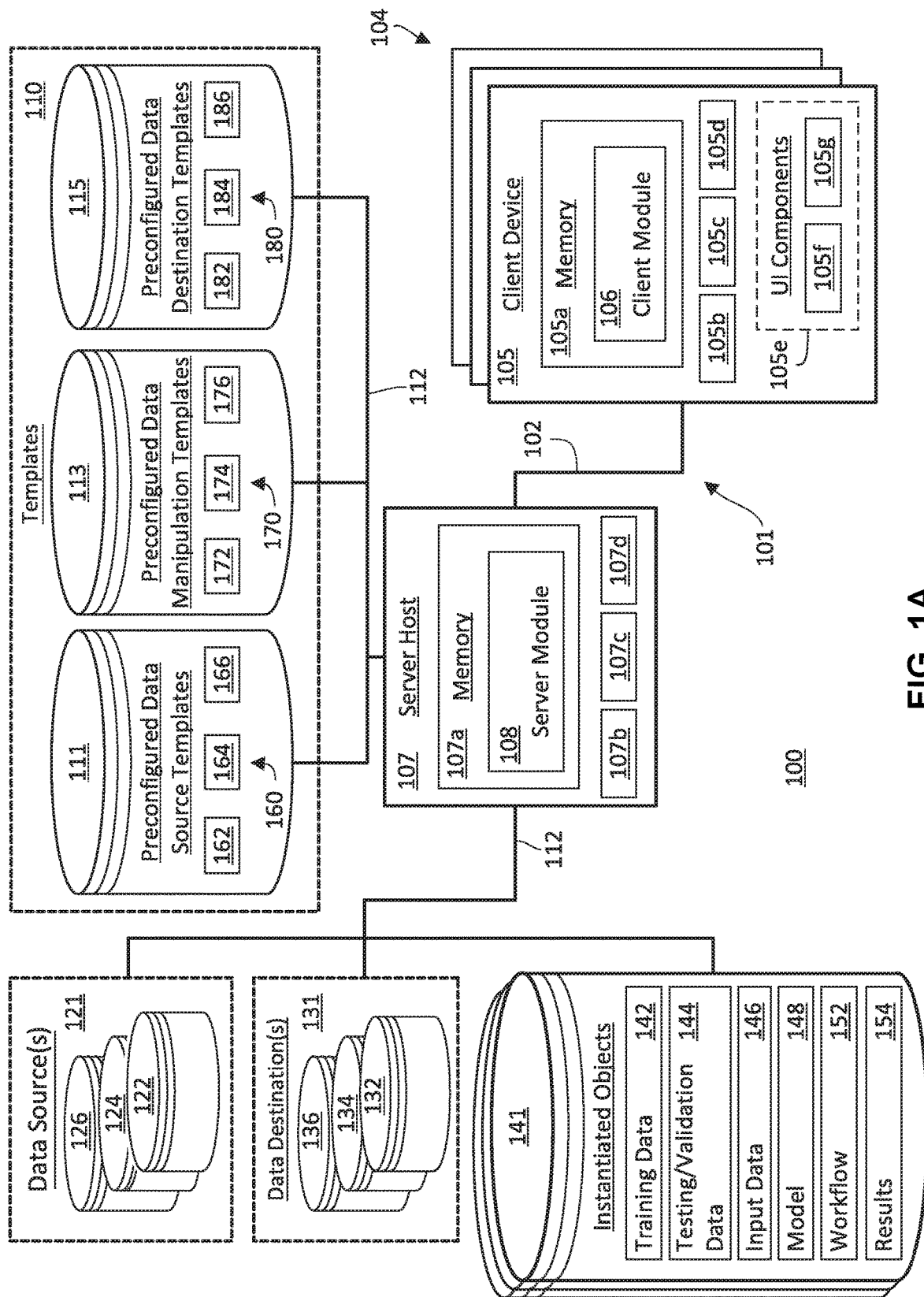
FIG. 1A is a block diagram of an example system that may be implemented to configure ML services, according to an embodiment.

FIG. 1A is a block diagram of an example system 100 that may be implemented to configure ML services, according to an embodiment. The system 100 includes a data pipeline tool 101. In example operation, the tool 101 provides a ML design interface that a user can utilize (e.g., via an electronic device such as a personal computer, tablet, or smart phone) to design or configure data pipelines or workflows defining the manner in which ML models are developed, trained, tested, validated, or deployed.

The tool 101 may display a canvas area and one or more "libraries" of templates that a user can drag and drop into the canvas area. For example, a user may drag and drop into the canvas area an icon representing a particular type of ML model or algorithm. The user may then drag and drop into the canvas area one or more icons representing datastores. The user may connect the datastore icons to the model icon, and may provide input indicating that the data is to be utilized for developing the model (e.g., when the data is training data, testing data, or validation data) or indicating that the data is to be utilized when the model is deployed (e.g., when the data is input data that will be utilized to develop predictive results). Similarly, the user may drag and drop, into the canvas area, a datastore icon and may connect the datastore icon to the model icon. The user may provide input indicating, for example, that model results are to be stored at the data destination(s). In some instances, a model icon may include one or more input connection points (e.g., for connecting a link graphic to a datastore icon intended to be a data source) or one or more output connection points (e.g., for connecting a link graphic to a datastore icon intended to be a data destination). Similarly, a datastore may have one or more input connection points (e.g., for connecting a link graphic to a model output, indicating that the datastore will be a data destination for data from the model) or one or more output connection points (e.g., for connecting a link graphic to a model input, indicating that the datastore will be a data source providing data to the model, such as training data for training the model or input data for generating predictive results). The tool 101 may include a microphone configured to receive audio input (e.g., voice input). The tool 101 utilize the microphone to provide natural language capability, enabling a user to speak to the tool 101 such that the tool 101 responds by displaying results in a graphical format. For example, a user may ask the tool 101 to "list the 2019 insurance policies that have more than $10,000 in claims," and the tool 101 may display a representation of the requested policies. Many or all of the commands that users may input using a mouse or a keyboard may also be entered through voice commands. In some instances, the tool 101 may provide built-in security so that a user can only access functionality that is granted to him or her by an administrator. In some embodiments, the tool 101 may integrate with existing data access approval processes, including workflows for security requests, approvals, and tracking. If desired, the tool 101 may automate the completion and submission of security forms that are typically manually entered. Further, in some instances the tool 101 may integrate with existing metadata services and catalogs. The tool 101 may pull metadata from the data sources and insert metadata into data service catalogs. The tool 101 may maintain the data retention policy and automatically remove data and metadata that exceeds the retention period.

The user may utilize the tool 101 to save the workflow and configured model. The workflow may saved as an object including one or more variables (e.g., identifying the appropriate model and datastores) and one or more functions (e.g., retrieving data, storing data, training the model, deploying the model, etc.). If desired, the user may later utilize the tool 101 to again configure the model training (e.g., to update data sources utilized for training purposes) or to configure model deployment (e.g., using new input with the same model).

A workflow may be thought of as depicting the steps needed to complete a job, including, for example, the order the tasks need to be executed, the data sources that need to be invoked, the calls that need to be made, data preparation steps, data mapping between the data and model inputs, how the model will be called, how the model output will be stored, etc.

In a first example use case, someone may want to predict the path and severity of a hurricane, including estimating wind speeds, rain accumulation, etc., and ultimately predicting the amount of flooding and property damages. This first use case may require data from external weather services as well as internal data, such as the location of home policies, home building standards, and flood plain locations. The data may be input to a model that predicts damage severity, financial loss, number of claims, or the number of people required to provide customer and claims support. Once a loss occurs, the actual loss data along with the predicted results may be input to the model in order to make future predictions more accurate. The workflow may be built using tool 101 and saved for future reuse. The workflow may be executed on a regular basis, and the results may be shared with executive, claims, underwriting, and other departments.

In a second example use case, an underwriting process may be facilitated. That is, a customer's home owner policy application may be processed and accepted through a machine learning model. The model may rely on various data sources, such as past claim information, home location information, fire department location, flood zone information, earth quake risk information, or home inspection information. A user of the tool 101 may build a workflow to retrieve information from the data sources, and use that data as input to the model. The model may then run and send an underwriting decision to the necessary parties. The workflow may be saved and run when a new homeowner's application is submitted.

In a third example use case, a model may be utilized to identify the extent of roof damage and to estimate the cost to repair the roof and process the claim. Roof pictures may taken (e.g., by drone) and compared to previous roof pictures or claim history in order to establish the estimated costs to repair. Repair costs may also be compared to the customer's policy coverages in order to complete the claim. The workflow may be saved and run when there is new roof claim submitted by the customer.

In a fourth example use case, a model may be created to process and identify the extent of vehicle damage, and to estimate the cost to repair the damage and to process the claim. The model may rely on vehicle damage pictures taken by the customer, vendor, etc., along with prior claim history, cost of parts, and the estimated labor hours to repair the damage. Repair costs may be compared to the customer's policy coverages in order to complete the claim. Once the user builds the workflow to retrieve the data from these data sources and input the data into the model, the model may be run and a final decision may be sent to the appropriate parties. The workflow may be saved and run when there is a new claim submitted by a customer.

In some examples, a model may facilitate sentimental analysis based on data such as social media content and phone call data. In such examples, the data is collected after receiving explicit permission from a user to utilize such data. In these examples, a model may take data from various data sources (internal and external) associated with social media and may produce top categories about how customers are feeling. This workflow may involve pulling data from different sources and classifying and categorizing the data. Once the data is prepared, it could be sent to the model as input and the model may mine the data and extract top categories in order to analyze customer satisfaction.

Finally, in example operation, a user of the tool 101 may drag and drop icons representing data sources and may prepare data by connecting the data through preparation templates. The model may prepare the data, and connect the data to target data sources before processing the model to create the desired output. The user has option of selecting different types of model algorithms to process the data.

An Overview of an Example Dataset Structure that May be Utilized by the Tool 101

Figure 1B:
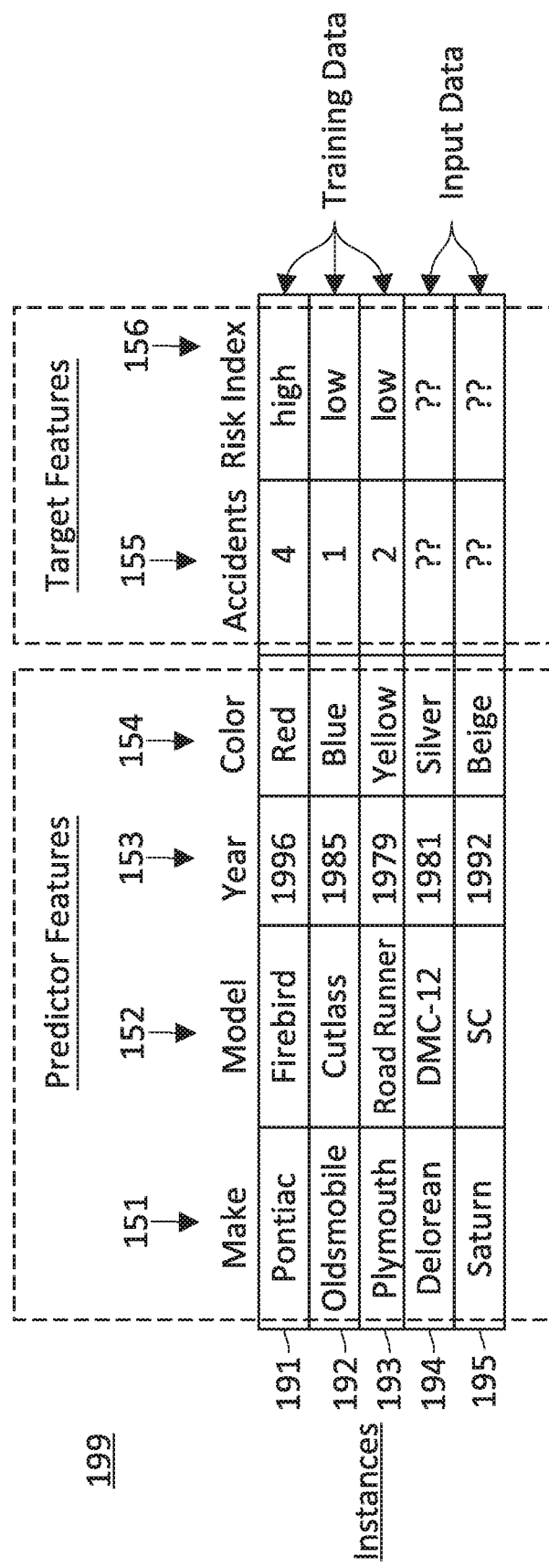
FIG. 1B shows a table representing one or more datasets that might be utilized by the example system shown in FIG. 1A to develop a ML model or to generate predictive results when the ML model is deployed, according to an embodiment.

FIG. 1B shows a table 199 representing one or more datasets that might be utilized by the tool 101. Generally speaking, the tool 101 may utilize structured datasets similar to that shown in the table 199 (e.g., as training data, testing data, validation data, or input data). These structured datasets may be thought of in terms of rows or columns, like one might see in a typical table in a database or spreadsheet. Note, in some instances the tool 101 may utilize unstructured data (e.g., images, videos, text, etc.), which may not be formatted like the table 100B. While the table 199 includes data pertaining to vehicles, it should be understood that the training data, testing/validation data, and input data utilized by the tool 101 may pertain to any suitable subject, depending on the desired implementation of the tool 101.

Each row 191-195 of the table 199 represents an "instance" and each column 151-156 represents a "feature." Generally speaking, each instance is a collection of features associated with a single observation or sample (and thus may be referred to as an "observation" or "sample"). Typically, a dataset includes one or more instances. Referencing the table 199, each instance 191-195 represents a collection of features pertaining to a category of vehicles (the category being defined by the predictor features 151-154).

A "feature" is a component of an observation or instance, and may be referred to as an "attribute," "variable," or "data instance." Each feature or attribute value may be thought of as descriptive, in some capacity, of a corresponding instance. For example, the feature 154 for the instance 191 has a value of "red," indicating that the category of vehicle represented by the instance 191 is limited to those having the color "red." This category is further limited by features 151-153.

A "predictor" or "predictor feature" (e.g., features 151-154) represents an input to a model and a "target" or "target feature" (e.g., features 155 and 156) represents an output from a model. In some instances, predictor features may be referred to as input features/variables/attributes or independent features/variables/attributes. Similarly, in some instances, target features may be referred to as output features/variables/attributes or dependent features/variables/attributes.

Predictor features may be thought of as known information that will be utilized to make predictions regarding unknown features. These unknown features are represented by the unknown values of the target features for the instances 194 and 195. Said another way, the target features represent information one wants to predict for an instance based on known values for "predictor feature" utilized as input to the model.

For training datasets utilized to train a model (e.g., instances 191-193), the values of the target features are known. The relationship(s) between predictor feature values and target feature values are analyzed to develop a model or algorithm capable of accurately generating target feature values based on a set of predictor feature values. Similarly, validation and testing datasets typically include target feature values, as they are used to test the accuracy of a model. Input data (e.g., instances 194 and 195) utilized by a deployed model typically includes only predictor feature values, which the model utilizes to estimate or predict target feature values.

At a high level, target values are often either categorical ("which one?") or continuous ("how much" or "how many") in nature. For example, the feature 155 is continuous and the feature 156 is categorical. Note, however, that data types for each feature may be considered with a higher degree of specificity. For example, a feature may have a categorical data type, wherein the value of that feature may be one of two or more categories (in some instances, the categories have no intrinsic ordering). A feature may have an ordinal variable type, which may be thought of as an ordered category type. For example, each value may be one of a number of ordered categories, such as low, medium, and high. Further, a feature may have a real or integer data type, or more complex data types such as strings, dates, times, etc.

In a typical example, a model may be thought of as arriving at target feature values via classification, which is the task of predicting a discrete or categorical target value (e.g., is this category of vehicle "high risk" or "low risk"?), or via regression, which is the task of predicting a continuous quantity (e.g., generating an expected number of annual accidents given the values for features 151-154). Note, some overlap may exist. A classification model may predict a continuous value in the form of a probability for a class label (e.g., 75% likely to be "high risk"). Further, a regression model may predict a discrete value in the form of an integer quantity.

An Example Method 200 of Developing and Utilizing a Model Via the Tool 101

Figure 2:
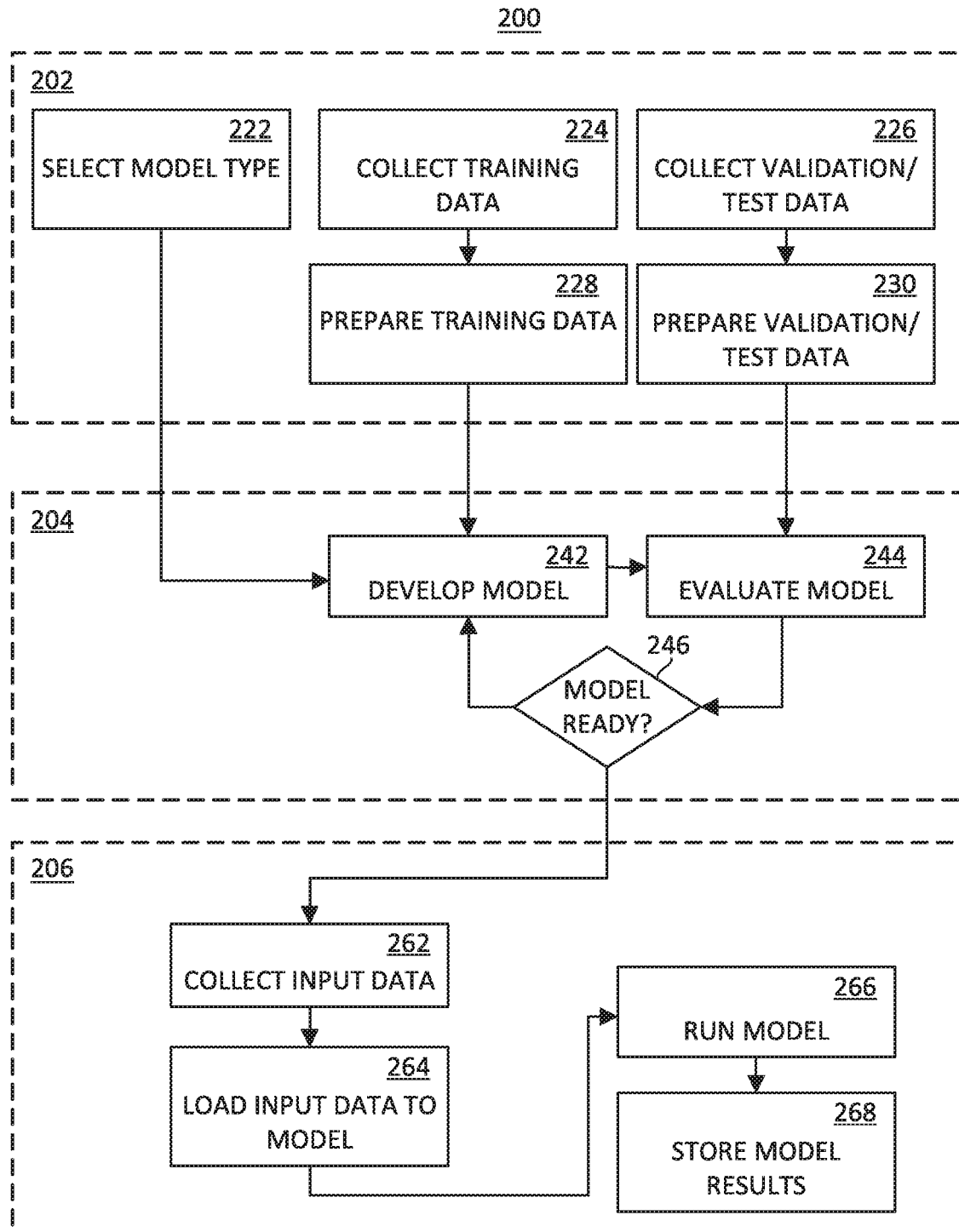
FIG. 2 depicts an example method for developing and utilizing a ML model that may be implemented via the example system shown in FIG. 1A, according to an embodiment.

FIG. 2 depicts an example method 200 for developing and utilizing a model that may be implemented via the tool 101. At a high level, the method 200 includes a step 202 for model design and preparation, a step 204 for model development and evaluation, and a step 206 for model deployment.

The step 202 may include any one or more steps or sub-steps 222-230, which may be implemented in any suitable order. At the step 222, the tool 101 receives or selects a model type. At the step 224, the tool 101 collects training data for training the selected model (e.g., from one of the data sources 121 shown in FIG. 1A). At the step 226, the tool 101 collects test data for testing the model or validation data for validating the model (e.g., from one of the data sources 121). At the steps 228 and 230, the tool 101 prepares the training data, testing data, or validation data for use by the model. Generally speaking, data preparation ensures that data is consumable by a model in an expected manner. Data preparation may include data classification, data joins, data softening/hardening, data features extraction, data transformation, data aggregation and sorting, etc. In some examples, geolocation-related data (e.g., flooding zone data, wild fire zone data, or earthquake prone zone data) is joined with a home owner's policy property location. In such examples, the model may determine what risks the home has and whether or not the policy is acceptable for a given premium. The model may provide information about the policy coverages and whether or not the deductible amount is sufficient. After the sub-steps 222-230 of step 202 have been completed, the tool 101 may implement the step 204.

The step 204 may include any one or more steps or sub-steps 242-246, which may be implemented in any suitable order. In a typical example, the tool 101 develops the model (the step 242), evaluates the model (the step 244), and determines if the model is ready for deployment before either proceeding the step 206 or returning to the step 242 to further develop the model.

Regarding the sub-step 242 of step 204, developing the model typically involves training the model using training data. At a high level, machine-learning models are often utilized to discover relationships between various observable features (e.g., between predictor features and target features) in a training dataset, which can then be applied to an input dataset to predict unknown values for one or more of these features given the known values for the remaining features. These relationships are discovered by feeding the tool 101 training data including instances each having one or more predictor feature values and one or more target feature values. The model then "learns" an algorithm capable of calculating or predicting the target feature values given the predictor feature values.

Regarding the sub-step step 244 of step 204, evaluating the model typically involves testing the model using testing data or validating the model using validation data. Testing/validation data typically includes both predictor feature values and target feature values, enabling the tool 101 and any users of the tool to compare target feature values predicted by the model to the actual target feature values, enabling one to evaluate the performance of the model. This testing/validation process is valuable because the model, when implemented, will generate target feature values for future input data that may not be easily checked or validated. Thus, it is advantageous to check one or more accuracy metrics of the model on data for which you already know the target answer (e.g., testing data or validation data), and use this assessment as a proxy for predictive accuracy on future data. Example accuracy metrics include key performance indicators, comparisons between historical trends and predictions or results, cross-validation with subject matter experts, comparisons between predicted results and actual results, etc.

Regarding the sub-step 246 of the step 204, the tool 101 may utilize any suitable set of metrics to determine whether or not to proceed to the step 206 for model deployment. Generally speaking, the decision to proceed to the step 206 or to return to the step 242 will depend on one or more accuracy metrics generated during evaluation (the step 244). After the sub-steps 242-246 of the step 204 have been completed, the tool 101 may implement the step 206.

The step 206 may include any one or more steps or sub-steps 262-268, which may be implemented in any suitable order. In a typical example, the tool 101 collects input data (the step 262), loads the input data to the model (the step 264), runs the model with the input data (the step 266), and stores results generated from running the model on the input data (the step 268).

Note, the method 200 may be implemented in any desired order and may be at least partially iterative. That is, the step 202 may be implemented after the step 204 or after the step 206 (e.g., to collect new data for training, testing, or validation), and the step 204 may be implemented after the step 206 (e.g., to further improve the model via training or other development after deployment).

Components of the Data Pipeline Tool 101

Returning to FIG. 1A, the tool 101 includes: one or more client devices 104, including a client device 105 (also referred to as the "clients 104" and the "client 105"); a server host 107 (also referred to as the "server 107"); and one or more links or networks 102 coupling the host 107 to the clients 104. The server 107 may be coupled via one or more links or networks 112 to any one or more of: (i) a set of databases 110 storing templates that can be utilized design or configure a workflow; (ii) a set of databases 121 that may function as data sources for a workflow; (iii) a set of databases 131 that may function as data destinations for a workflow; and (iv) a set of databases 141 storing objects that have been instantiated for a particular workflow designed via the tool 101.

The Database(s) 110 for Templates

The databases 110 includes: (i) a database 111 storing templates 160 for preconfigured data sources; (ii) a database 113 storing templates 170 for preconfigured ML models or algorithms; and (iii) a database 115 storing templates 180 for preconfigured data destinations. The data source templates 160 include data source templates 162-166; the model templates 170 include model templates 172-176; and the data destination templates 180 include data destination templates 182-186. In some instances, the templates 160 and the templates 180 may be stored as a single group of datastore templates (e.g., in one or more databases).

Generally speaking, each template 160-180 represents a class or template definition of a type of item that may be instantiated to create an object. Each template may include a number of preconfigured attributes, graphics, etc. associated with the corresponding type of item. Each template may have an associated graphic or icon, which may be displayed to a user when he or she is using the tool 101. The user may instantiate a particular object from one of the templates, which may involve inputting particular parameter values or other information particular to an instantiated object (e.g., an IP address for a particular data source that will be utilized to train a model). Example information input by a user may include: a database name, table, query, etc; a mapping of service inputs with where data is coming from (e.g., when the data source is a web service for weather, and the user provides a zip code or city name;) security credentials for accessing secured data; etc. The user may instantiate an object from a template by dragging and dropping the template icon into a canvas area. In any event, as noted, each template 160-180 represents a class or template definition of a type of item.

For example, the data source template 162 may represent a first database type or schema (e.g., HIVE); the data source template 164 may represent a second database type or schema (e.g., HDFS); and the data source template 166 may represent a third database type or schema (e.g., Cassandra). Other example database types include Postgres, Oracle, DB2, Mango DB, Dynamo DB, AWS S3, AWS Aurora etc. The data destination templates 182-186 may similarly represent various different database types or schemas.

Finally, the model templates 172-176 may each represent a different type of ML model or algorithm. For example, the model 172 may be a linear regression model template; the model 174 may be a k-nearest neighbors (KNN) model template; and the model 176 may be a neural network model. Other example ML algorithms that may be represented by the templates 172-176 include logistic regression models; linear discriminant analysis (LDA) models; classification and regression tree models; naïve bayes models; learning vector quantization (LVQ) models; support vector machine (SVM) models; bagging and random forest models; boosting and adaBoost models; neural networks; long short-term memory (LSTM) and Recurring neural network (RNN) models; reinforcement learning models; decision trees; etc.

The Data Source Database(s) 121

The databases 121 includes databases 122, 124, and 126. Generally speaking, each of the databases 121 may be utilized as a source of data for model development (e.g., training data, testing data, or validation data) or as a source of data when the model is deployed (e.g., input data the model relies on to develop predictive results). The various databases 121 may be configured according to different standards, protocols, and languages.

In operation, a user may select a particular one of the databases 121 as a data source for a model by selecting an icon representing one of the templates 160, dragging and dropping the icon into a canvas or configuration area of a GUI, and interacting with the icon or GUI to provide one or more properties (e.g., an IP address) particular to the particular database 121. For example, if the data source 122 is a HIVE database, a user may select the data source template 162 (e.g., representing a template for HIVE databases), place the template 162 into a canvas area, and configure the template 162 to correspond to the database 122 (e.g., by entering an IP address for the database 122).

The Data Destinations Database(s) 131

The databases 131 include databases 132, 134, and 136. Generally speaking, each of the databases 131 may be utilized as a datastore for results generated by a model created using the tool 101. In operation, a user may select a particular one of the databases 131 as a datastore for results from a model by selecting a one of the templates 180 and configuring the template to correspond to the particular database (e.g., by entering an IP address for the particular database).

The Database(s) 141 for Instantiated Objects

The databases 141 store one or more instantiated objects created by a user via the tool 101. For example, the databases 141 may store: (i) one or more data source objects such as a training data object 142, a testing/validation data object 144, or an input data object 146; (ii) one or more model objects, including a model object 148; (iii) one or more data pipeline or workflow objects, including a workflow object 152; and (iv) one or more data destination objects, including a results object 154. Each object in the database 141 is a data structure, a set of functions, a set of variables, or some combination thereof, and is generally referencable by way of an identifier associated with the object.

Generally speaking, each object is instantiated from a template or class having a number of preconfigured settings or properties particular to that template or class. For example, a first template or class may exist for a KNN model and a second template or class may exist for a logistic regression. The first template may include the variables and logic necessary to implement a KNN algorithm and the second template may include the variables and logic necessary to implement a logistic regression algorithm. Generally speaking, an object instantiated from one of these templates inherits the properties from the corresponding template. However, a user may provide or edit a number of settings or properties before, during, or after instantiation to particularize the object (e.g., to specify a dataset to be fed to the model, or to specify a datastore for retrieving the dataset). In some instances, a user may instantiate an object that is identical to a template, particularly when the template includes default properties (e.g., the first or second template may include a default example dataset that is fed to model if properties are not edited).

Regarding the data source objects storable at the database 141 such as the data source objects 142-146, each data source object generally represents a particular one of the data sources 121 and may include or reference information about the data source object. Each data source object may be an object instantiated from one of the data source templates 111. For example, each data source object may include one or more parameters identifying any one or more of the following pieces of information for the corresponding data source: a unique ID; a network address; a database type or schema; one or more functions particular to the schema, etc.

Regarding model objects such as the model object 148, each model object represents a particular model or algorithm that is or will be utilized in a workflow (e.g., from one of the model templates 113). Each model object may include or reference information particular to an instantiated object, such as a unique ID, a model type, an ID of one or more data source objects, an ID of one or more data destination objects, a mapping of the input and output objects to particular inputs and outputs of the model (e.g., to indicate which of the data source objects is utilized for training data, validation data, testing data, or input data during model implementation).

Regarding data destination objects such as the results object 154, each data destination object represents a particular one of the data destinations 131, and may include or reference information or parameters similar to that included or referenced by the data source objects. Each data destination object may be an object instantiated from one of the data source templates 115.

Regarding workflow objects such as the workflow object 152, each workflow object represents a data pipeline or workflow involving a particular model, as well as data inputs and outputs for that particular model. Each workflow object may include or reference information particular to the model (e.g., model type, model ID, etc.), as well as information pertaining to: (i) data sources used for training data, testing data, validation data, or input data; and (ii) data destinations used for storing results from the particular ML model. Each workflow object may reference unique identifiers for each model, data source, and data destination included in the workflow. In some instances, each workflow object may include or reference other objects, such as training data objects, testing/validation objects, input data objects, model objects, or data destination objects, as well as defined relationships between any one or more of these objects (e.g., indicating which data sources input data to a model and which data destinations store results from the model). These relationships, taken as a whole, may indicate the flow of data from data sources to the model and from the model to one or more data destinations. In some instances, a workflow object may be instantiated from a workflow template (not shown).

Each object instantiated by way of the tool 101 may have a number of attribute values corresponding to the entity represented by the particular object. For example, the training data object 142 may represent the data source 122, which may store training data that will be utilized to train a model. Thus, the object 142 may include identifying information particular to the data source 122 (e.g., an IP address) and information the particular data to be pulled from the data source 122 (e.g., variable names, variable addresses, etc.).

Figure 3:
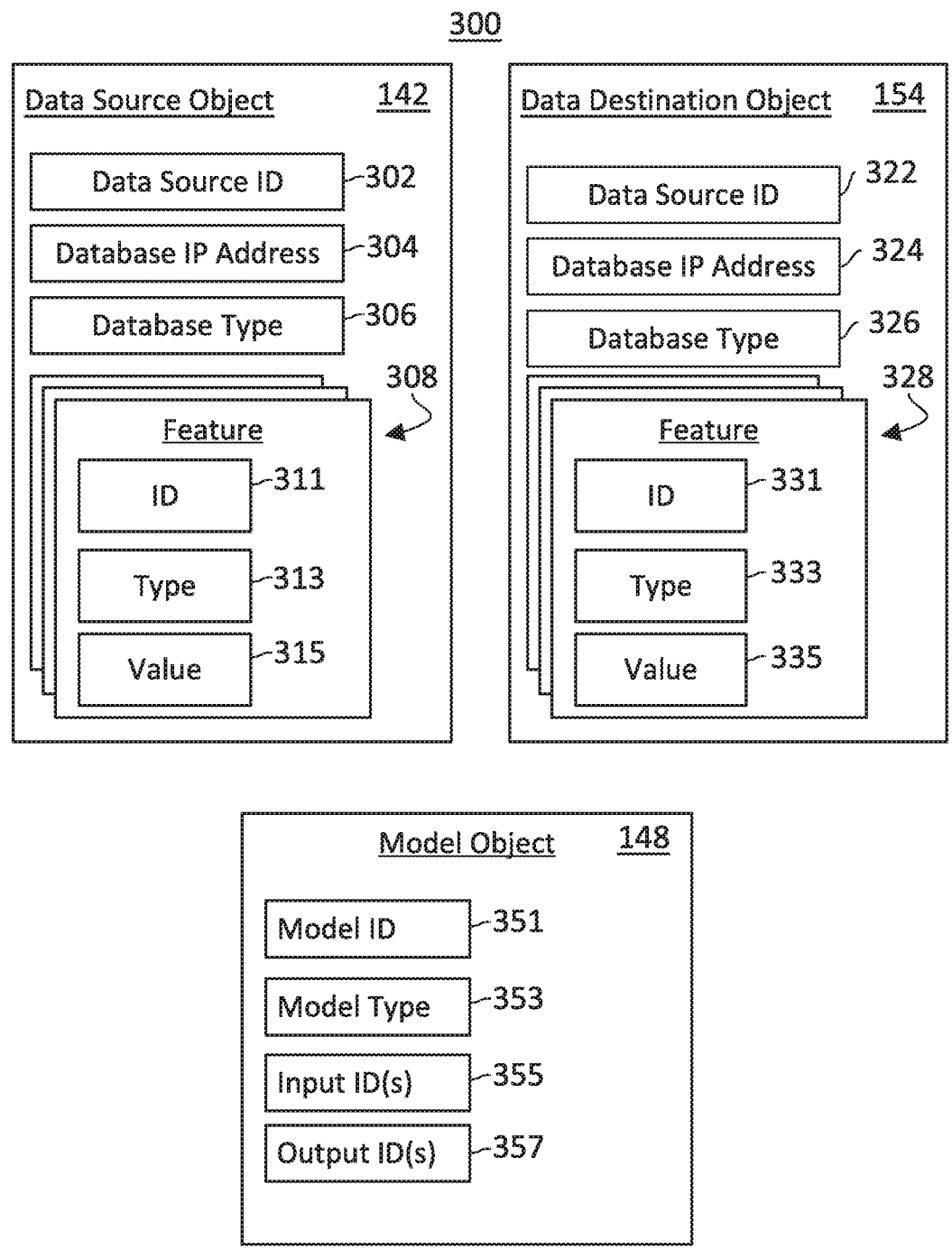
FIG. 3 depicts example data that may be associated with objects created using the example system shown in FIG. 1A, according to an embodiment.

To further illustrate, FIG. 3 depicts example data 300 that may be associated with the objects 142, 154, and 148 created using the tool 101, according to an embodiment. Other data source objects, data destination objects, and model objects may reference or include data or attributes similar to those shown in FIG. 3. Each object may include or reference any of a number of parameters, including features of interest (e.g., predictor or target) as well as metadata pertaining to the object in question.

For example, the data source object 142 includes an ID parameter 302 having a value unique to the object 142, an IP address parameter 304 having a value representing the IP address for the data source 122 storing the data of interest (e.g., training data), a type parameter 306 having a value representing the type or scheme of database utilized by the data source 122, etc. The data source object 142 may also include one or more feature parameters 308, each storing a feature value 315. Each parameter 308 may also include metadata particular to the parameter 308, such as a parameter ID 311 for the parameter 308 (e.g., a variable name) and a parameter type 313 for the parameter 308 (e.g., boolean, integer, float, string, etc.).

The data destination object 154 may have parameters 322-335 similar in nature to those describe with reference to the object 142. Note, however, that while the data source object 142 may, in some instances, only include values 315 for predictor features (e.g., when the object 142 represents training data), the data destination object 154 may include or reference values 135 for target features as well as values for predictor features.

The model object 148 may have any one or more parameters 351-357, including an ID parameter 351 having a value that uniquely identifies a particular model; a type parameter 353 identifying the type of model; one or more input ID parameters 355 having values storing IDs for objects feeding the model 148 data (e.g., training data or input data); or one or more output ID parameters 357 having values storing IDs for objects representing datastores where predictive results from the model 148 will be stored.

The Client 105 and the Server 107 of the Tool 101

Returning to FIG. 1A, the client 105 is an electronic computing device including a memory 105*a*, a processor 105*b*, an input/output (I/O) interface 105*c*, and a communication interface 105*d*, each of which may be communicatively connected to a system bus (not shown) of the client 105. Each of the other client devices 104 may be similarly configured relative to the client 105.

The I/O interface 105c of the client 105 may be communicatively coupled to one or more UI components 105e, including a display 105f and an input component 105g. The display 105f may be any suitable component or device configured to display information in pictorial or visual form (e.g., utilizing LED, LCD, or CRT technology), and may include a screen (which may be touch sensitive in some instances), projector, or any other output device capable of providing visual output. The input component 105g may be any suitable component or sensor that can be actuated or interacted with to provide input to the client 105, and may include a hardware actuator that mechanically actuates to provide input (e.g., a key, a button, etc.) and/or a sensor that actuates by way of detecting changes in an electromagnetic field (e.g., a capacitive or a resistive touch sensor, which may be integrated with the display 105f to form a touchscreen).

The memory 105a of the client 105 includes a client module 106 (sometimes referred to as the "module 106"). The module 106 is a set of machine readable instructions (e.g., a software module, application, or routine) that, when executed by the processor 105b, causes the client 105 to communicate with the server 107 and to receive from the server 107 data utilized to provide a graphical user interface (GUI) for interacting with the pipeline tool 101. The module 106 may be a dedicated application for the pipeline tool 101 or may be an application not dedicated specifically for the pipeline tool 101 (e.g., a web browser).

Turning to the server 107, the server 107 is an electronic computing device including a memory 107a, a processor 107b, an I/O interface 107c, and a communication interface 107d, each of which may be communicatively connected to a system bus (not shown) of the server 107. In some instances, the described functionality of the server 107 may be provided by a plurality of servers similar to the server 107.

The memory 107a of the server 107 includes a server module 108, which is a set of machine readable instructions (e.g., a software module, application, or routine) that, when executed by the processor 107b, causes the server 107 to communicate with, and provide data to, the client 105 so that the client 105 can provide the GUI for the tool 101. In some instances, the memory 107a includes an instance of the client module 106, enabling the server to provide the client functionality to a local user of the server 107.

The server 107 and the client 105 coordinate to enable the tool 101 to: (i) initiate a configuration session; (ii) detect a workflow defined by a user; (iii) instantiate the workflow and associated objects; (iv) develop the model included in the workflow; (v) implement the model in the workflow to develop predictive results; and (vi) provide interactive visualizations of the predictive results. Functionality provided by the server 107 and the client 105 is described in further detail below.

An Example GUI 400 that May be Presented by the Tool 101

Figure 4:
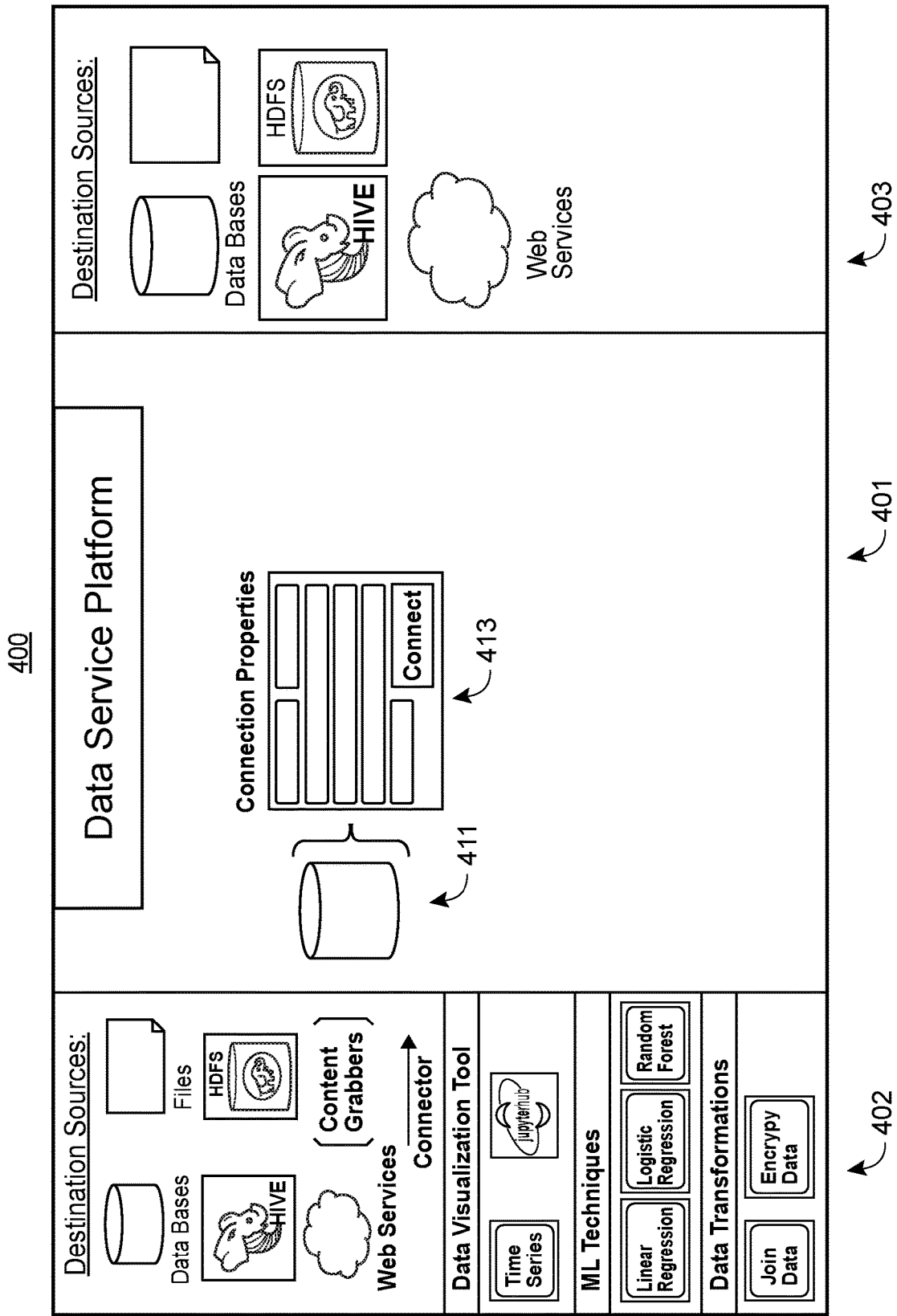
FIG. 4 depicts an example graphical user interface (GUI) that may be presented by the example system shown in FIG. 1A, according to an embodiment.

FIG. 4 depicts an example GUI 400 that may be presented by the tool 101, according to an embodiment. The GUI 400 includes a first area 401 representing a canvas or configuration area into which icons representing templates for data sources, models, or data destinations may be placed to create a workflow object. The GUI 400 also includes a second area 402 including data source templates and model templates that may be selected and dragged to the first area 401, as well as a third area 403 including data destination templates that may be dragged and placed into the first area 401.

As shown in the depicted example, an icon 411 has been dragged into the area 401 from the area 402 to begin creating a workflow. Generally speaking, the icon 411 represents a template data source when located in the area 402. After being placed in the area 401, the icon 411 may represent a particular data source object that has been or will be instantiated, at which point the icon 411 and the corresponding data source object represent a particular data source.

More generally, using the GUI 400, a user may instantiate a workflow as well as objects representing any data sources, models, or data destinations that are part of the workflow. As already noted, the instantiated objects may be created using one or more templates as a starting point. Instantiating an object from a template may involve setting or modifying one or more values for attributes associated with the instantiated object.

For example, the area 401 includes a prompt 413 requesting the user to enter data about the data source (e.g., IP address, name, etc.). A similar prompt may be generated for any template data source, model, or destination selected for a work flow. Further, the user may place additional templates in the area 401 (not shown) representing additional data sources, models, or data destinations to create objects based on each of the templates and to create a workflow (e.g., similar to the workflow object 152) referencing each of the created objects.

An Example Visualization 400 of the Workflow Object 152

Figure 5:
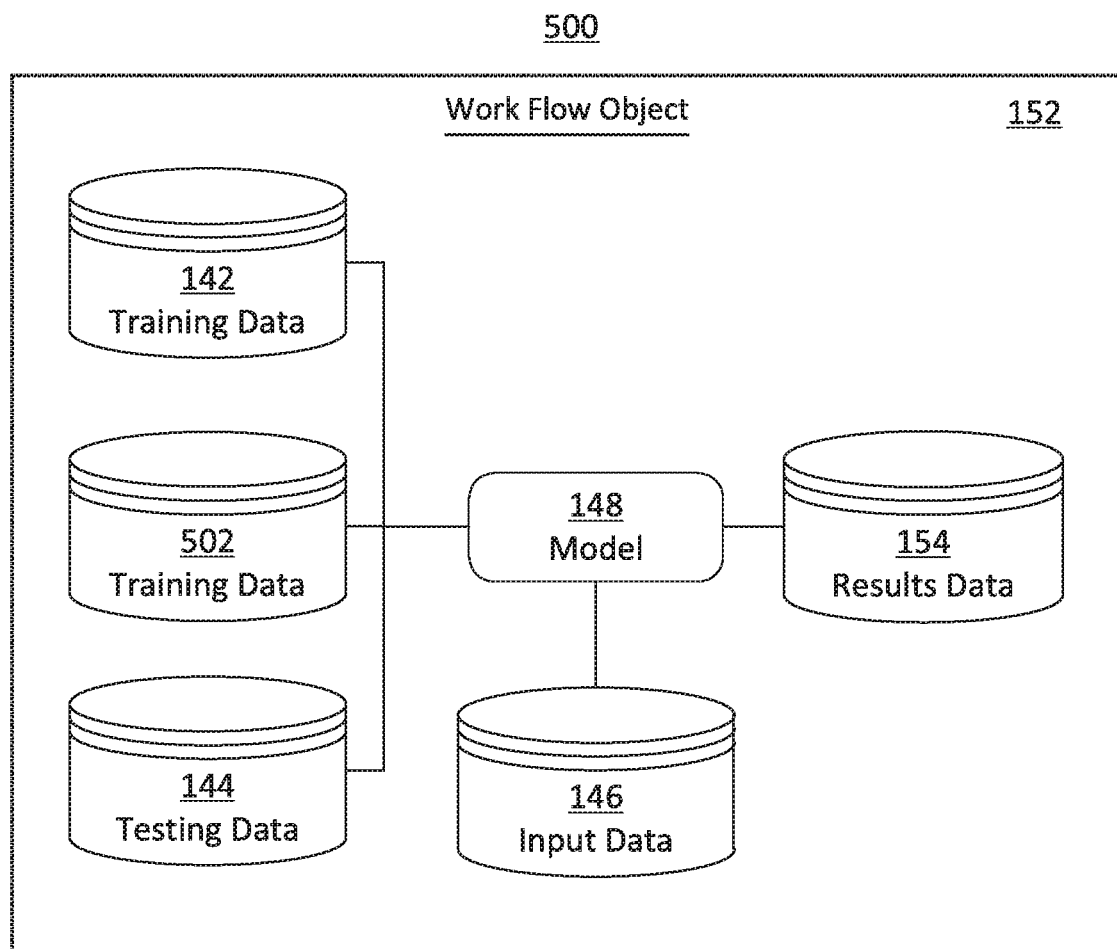
FIG. 5 is an example visualization of a workflow object that may be created utilizing the example system shown in FIG. 1A, according to an embodiment.

FIG. 5 is an example visualization 500 of the workflow object 152 shown in FIG. 1A, which may be created utilizing the tool 101 or the GUI 400, according to an embodiment. More broadly, the visualization 500 may be understood as depicting a conceptual workflow or data pipeline represented by the workflow object 152.

The workflow 152 includes the model object 148, the results object 154, and four data source objects: the training data object 142, the testing data object 144, the input data object 146, and a training data object 502. All objects shown in FIG. 5, other than the object 502, are also shown in FIG. 1A. The training data objects 142 and 502 are utilized to train the model 148 and the testing data object 144 is utilized to test the model 148 and verify it is ready to deploy. After the model 148 is deployed, the model 148 is fed input data represented by the input data object 146, and the model 148 calculates or predicts a set of target features based on a set of predictor features included in each instance of the input data. The predicted set of target features may be stored at a data destination represented by the results data object 154.

The training data objet 142 may be instantiated utilizing the GUI 400 of the tool 101. For example, a user may drag, from the area 402 and into the area 401, an icon representing the data source template 162 (e.g., a template for a HIVE database). The user may then interact with the icon (or any other suitable part of the GUI 400) to set one or more attributes for the data source object 142. For example, the user may specify an IP address for the data source from which the tool 101 will retrieve the training data. As an example, the data source 122 may store the training data that the user wishes to utilize. Accordingly, the user may set an "IP Address" attribute of the object 142 to the IP address of the data source 122. The user may instantiate the data objects 402, 144, 146, and 154 in manners similar to that described regarding the object 142. Similarly, the user may instantiate the model object 148 from a template such as the model template 172 (e.g., representing a template for a k-nearest neighbor model), and may set attributes particular to the model represented by the object 148.

An Example Method 600 that May be Implemented by the Tool 101

Figure 6:
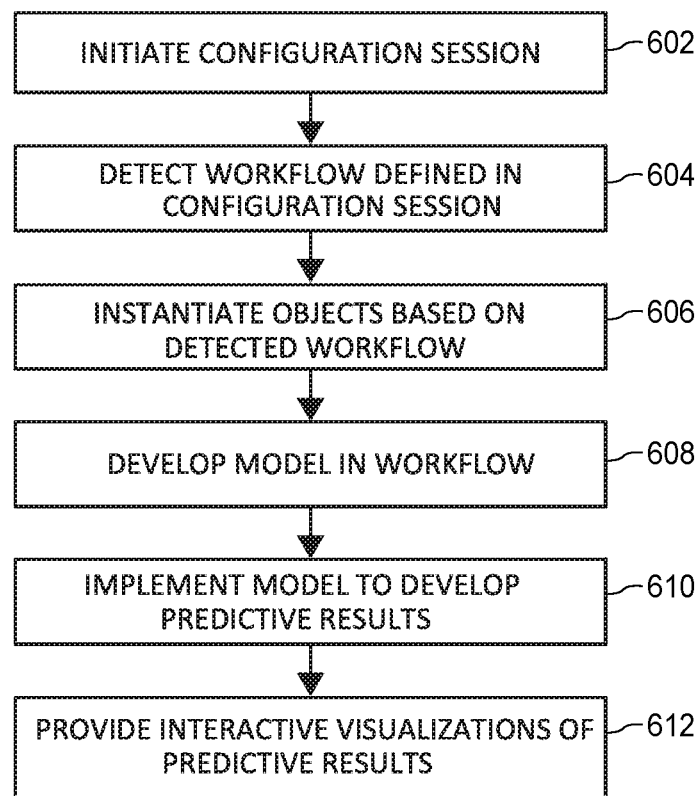
FIG. 6 is a flow chart of a method of configuring and utilizing ML services that may be implemented by the example system shown in FIG. 1A, according to an embodiment.

FIG. 6 is a flow chart of a method 600 of configuring and utilizing machine-learning services that may be implemented by the tool 101, according to an embodiment. The method 600 includes steps 602-618 and may be saved to a memory as one or more instructions or routines.

Step 602: Initiate a Configuration Session

In example operation, a user of the client 105 causes the client 105 to launch the client module 106 and to initiate a configuration session to define a workflow (e.g., the workflow 152 shown in FIGS. 1A and 4). The example described below involves the creation of the workflow object 152, but it will be understood that the tool 101 can be utilized to create any suitable workflow.

Creating or defining a workflow may involve the user actuating the input component 105g (e.g., using a mouse or a touch gesture) of the client 105 to select an icon representing the client module 106 (e.g., when the client 106 is a dedicated application) or may involve the user navigating to a website associated with the server 107 (e.g., when the client 106 is a browser). To initiate the configuration session, the client 105 may transmit to the server 107 a request to begin the session. The client 105 may transmit a user identifier or ID (e.g., a device ID or a user name, such as an email address, unique to the user) to the server 107 with the request. The user may provide the user ID and an associated password to log into his or her personal account when utilizing the client 105 to initiate the configuration session. After transmitting the request, the client 105 may receive from the server 107 data enabling the client 105 and the server 107 to establish the configuration session. For example, the server 107 may transmit data enabling the client 105 to display the GUI 400 (shown in FIG. 3) or a GUI similar to the GUI 400.

Step 604: Detect a Workflow Defined by a User

After the client 105 launches the GUI, a user may interact with the GUI to build the workflow. For example, the user may place a set of icons and connections in a "configuration area" of the GUI. Generally speaking, the icons and connections represent the model, data sources (e.g., for training data, testing data, or input data), and data destinations (e.g., for storing results from the model) that the user wants to include in the workflow. The icons may be "dragged" from a "library area" (e.g., the area 402 in FIG. 4) into the configuration area of the GUI. The client 105 or server 107 may detect the icons placed in the configuration area to detect the workflow the user wishes to create. FIG. 5 shows an example visualization 500 of the workflow 152, which may be created utilizing the tool 101 and GUI 400.

Step 606: Instantiate a Workflow Object and Associated Objects

After the user has defined the workflow (e.g., by placing icons in the above-described configuration area), the client 105 or server 107 instantiates: (i) the workflow object 152 representing the designed workflow and (ii) one or more objects representing data source(s), model(s), or data destination(s) included in the designed workflow. The user may set or modify values for attributes associated with the instantiated object (e.g., before, during, or after instantiation).

As noted, each object may have a set of preconfigured properties (e.g., variables with preconfigured values). For example, a KNN model template may have a "model type" variable or attribute indicating that the type of model is KNN. A user may provide or edit one or more of the preconfigured settings or properties before, during, or after instantiation to particularize the object (e.g., to specify a dataset to be fed to the model and an associated IP address, to specify a datastore for retrieving the dataset and an associated IP address, etc.).

Step 608: Develop the Model Included in the Workflow

After the workflow object 152 has been instantiated, the tool 101 may begin developing the model included in the workflow 152 (e.g., the model 148 in this example). For example, the model 148 may receive training data from a data source 122 represented by the training data object 142. The training data may include one or more instances, wherein each instance includes a first set of predictor feature values and a second set of target feature values. The tool 101 analyzes this first and second set for each instance in the training data and, based on the results of the analysis, develops logic representing a relationship between the first and second set. This logic enables the tool 101 to predict or calculate the target feature values from the predictor feature values.

The tool 101 may verify or test the developed logic by, for example, utilizing testing or validation data as an input. Generally speaking, the testing data has known target feature values, but these are not fed to the model. Rather, only predictor feature values are fed to the model. The tool 101 may then compare the predicted or calculated values to the known values for the target features. Based on how accurately and how often the model correctly predicts the target feature values, the tool 101 may continue developing the model using training data, or may be deployed for use.

Methods for evaluating results include: comparing results against key performance indicators; comparing predictions with actual results; utilizing cross-validation (e.g., running a use case with both a ML model and existing systems or processes); testing and reevaluating algorithms of the models; utilizing subject matter experts; etc. The threshold for concluding a model is accurate may vary depending on implementation. In some cases, 99% accuracy may be required. In other cases, 80% accuracy may be required.

Step 610: Implement the Model to Develop Predictive Results

After the model has been trained, the model may be implemented to develop predictive results. As an example, the model 148 may be fed input data associated with the input data object 146. The input data may include one or more instances, wherein each instance includes a set of predictor feature values. Based on these predictor feature values, the model 148 may predict a set of target feature values for each instance. The predicted values may be stored to a memory associated with the results object 154 (e.g., the data destination 132).

Step 612: Provide Interactive Visualizations of the Predictive Results

The tool 101 may present the predictive results via a GUI, and may enable the user to mark-up or otherwise interact with those results. The term "annotate" may be used interchangeably with the term "mark-up." Generally speaking, a user may mark-up or annotate a diagram including predictive results, resulting in the diagram including both the predictive results and the mark-up or annotation (e.g., a highlight, a drawn shape, a note include text, an arrow, a strike-through or x-out graphic, etc.)

The tool 101 may also enable the user to share the results. For example, the user may interact with an icon to cause the predictive results (which may be marked-up by the user) to be shared with another client device associate with another user. For example, the results may be shared via text messaging, via a social media application, via email, etc. In some instances, the results may be shared as a picture file (e.g., bmp, jpg, png, etc.), pdf, or any other suitable file type. Below, an example interactive visualization is described in more detail.

An Example Interactive Visualization 700

Figure 7:
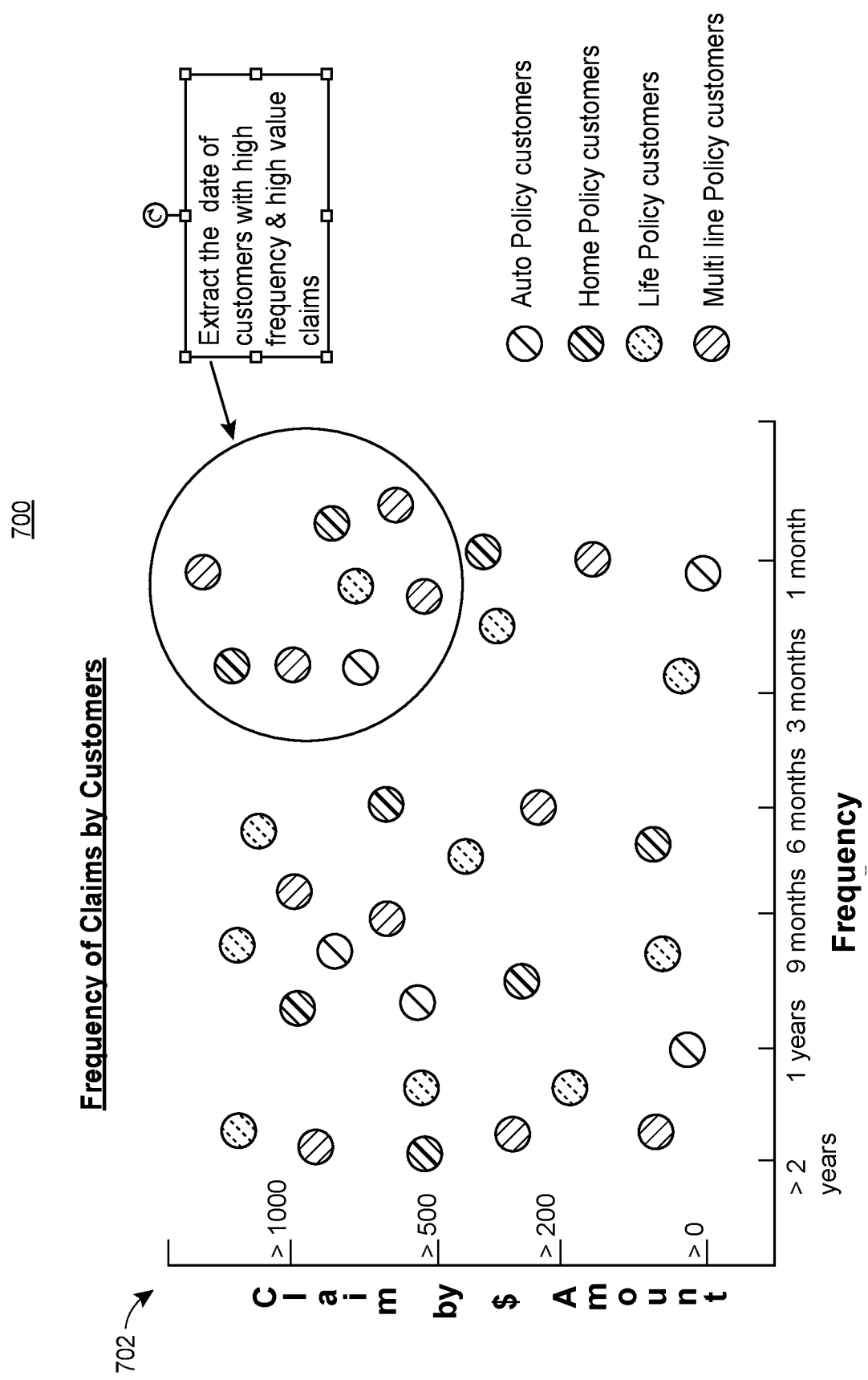
FIG. 7 shows an example interactive visualization of predictive results generated by a machine-learning model designed using the example system shown in FIG. 1A, according to an embodiment.

FIG. 7 shows an example interactive visualization 700 of predictive results generated by the model 148 that may be displayed by the tool 101. The visualization 700 may be generated from data represented by the results object 154 (e.g., stored at the data destination 132). The input data utilized to generate the visualization 700 may include different business line policies with customer information, along with claims of each policy.

The visualization 700 includes a mark-up 702, which a user may add to the visualization using any suitable input (e.g., a mouse, keyboard, touchpad and stylus, etc.). In the shown example, a user has marked up the visualization 702 by drawing a shape around a cluster of data points representing "malicious scripts." The use may save and share the marked-up visualization, and may rely on the mark-up 702 to highlight a particular piece of information (e.g., the malicious scripts).

Depending on the embodiment, the user may provide any suitable mark-up. For example, the user may add shapes (e.g., triangles, circles, rectangles, ovals, ambiguous shapes created using a "free form" drawing tool, etc.) and these shapes may be filled or not filled. The outlines and fill of such shapes may have any desired transparency, depending on the embodiment. In some instances, a user may change the color of data-points, add text, add a text box, add arrows, etc.

If desired, a user may share the marked-up visualization 700. For example, a user of the client 105 may cause the client 105 to transmit (e.g., via a network or direct link) the marked-up visualization 700 to one or more of the other clients 104. In some instances, the marked-up visualization 700 may be stored at the server 107, and the user of the client 105 may cause the server 107 to transmit the visualization 700 to one of the other clients 104. If desired, a user may edit a permission settings associated with the visualization 700, enabling a user of the of the other clients to request and receive the visualization (e.g., only when the permission setting allows that user or client to receive the visualization 700).

The visualization 700 may be stored as any suitable form of data. For example, in some instances the visualization 700 is saved, in whole or in part, as a picture (e.g., jpg, bmp, png, etc.), a pdf, a markup language file (e.g., XML or HTML), Json, free form text, comma separated values (CSV), instructed text, or any other suitable file type. In some instances, the visualization 700 is generated from the data represented by the results 154 each time the visualization 700 is rendered.

Note, the tool 101 may display any set of suitable results generated by the model 148 or by any other model developed using the tool 101. Depending on the nature of the model and the type of training data or input data utilized, the nature and form of the predictive results may differ.

Additional Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the methods 200 and 600, specifically, the described functions may be implemented, in whole or in part, by the devices, circuits, or routines of the system 100 shown in FIG. 1A. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers General Terms and Phrases Throughout this specification, some of the following terms and phrases are used.

Application. See "Routine."

Bus. Generally speaking, a bus is a communication system that transfers information between components insider a computer system, or between computer systems. A processor or a particular system (e.g., the processor 107*b* of the server 107) or subsystem may communicate with other components of the system or subsystem (e.g., the components 107*a*, *c*, and *d*) via one or more communication links. When communicating with components in a shared housing, for example, the processor may be communicatively connected to components by a system bus. Unless stated otherwise, as used herein the phrase "system bus" and the term "bus" refer to: a data bus (for carrying data), an address bus (for determining where the data should be sent), a control bus (for determining the operation to execute), or some combination thereof. Depending on the context, "system bus" or "bus" may refer to any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Cloud/Cloud Computing. The phrase "cloud computing" generally refers to a variety of concepts involving a large number of computers connected through a network (e.g., the Internet). In common usage, "the cloud" is often a metaphor for the Internet. "In the cloud" often refers to software, platforms, and infrastructure sold "as a service" (i.e., remotely through the Internet). The supplier of these services generally utilizes servers hosting products and services from a remote location, enabling individual users to access these products and services via the servers while requiring the users to install little if any software on their end-user devices. Example models of cloud computing services may be referred to as "software as a service," "platform as a service," and "infrastructure as a service." Cloud services may be offered in a public, private, or hybrid networks and may be implemented on hosts provided by third-party cloud vendors. In some instances, one or more components of the system 100 shown in FIG. 1A may be implemented via cloud computing services.

Communication Interface. Some of the described devices or systems include a "communication interface" (sometimes referred to as a "network interface"). For example, the server 107 includes a communication interface 107*d* and the client 105 includes a communication interface 105*d*. Each of the described communication interfaces enables the system of which it is a party to send information or data to other systems or receive information/data from other systems. In some instances, a communication interface of a system may be utilized to establish a direct connection to another system. In some instances, the described communication interfaces enable the corresponding system to connect via a link to a network (e.g., a personal area network (PAN), a local area network (LAN), or a wide area network (WAN)).

If desired, the described communication interfaces may include (i) circuitry that enables connection to a wired link that carries electrical or optical signals to another device (e.g., via a coax cable or fiber optic cable) and to communicate with that other device, or (ii) circuitry that enables wireless communication (e.g., short-range or long-range communication) via electromagnetic signals, such as radio frequency (RF) signals. The described communication interfaces and systems may conform to any one or more suitable communications protocols, standards, or technologies, such as those described herein.

Communication Protocols. In this description, communication protocols, standards, and technologies may be referred to generically as "communication protocols." Example communication protocols, standards, or technologies that may be utilized by the described systems include those that facilitate communication via nanoscale networks, near-field networks, personal area networks ("PANs"), local area networks ("LANs"), backbone networks, metropolitan area networks ("MANs"), wide area networks ("WANs"), Internet area networks ("IANs"), or the Internet.

Example near-field network protocols and standards include typical radio-frequency identification ("RFID") standards or protocols and near-field communication ("NFC") protocols or standards. Example PAN protocols and standards include 6LoWPAN, Bluetooth (i.e., a wireless standard for exchanging data between two devices using radio waves in the range of approximately 2.4 to 2.485 GHz), IEEE 802.15.4-2006, ZigBee, the Thread protocol, ultra-wideband ("UWB"), universal serial bus ("USB") and wireless USB, and ANT+. Example LAN protocols and standards include the 802.11 protocol and other high frequency protocols/systems for wireless communication in bands found in a range of approximately 1 GHz-60 GHz (e.g., including the 900 MHz, 2.4 GHz, 3.6 GHz, 5 GHz, or 60 GHz bands), as well as standards for suitable cabling such as coaxial and fiber-optic cabling. Example technologies used to facilitate wireless WANs includes those used for LANs, as well as 2G (e.g., GPRS and EDGE), 3G (e.g., UMTS and CDMA2000), 4G (e.g., LTE and WiMax), and 5G (e.g., IMT-2020) technologies. Note, the Internet may be considered a WAN.

Other communication protocols and standards that may be utilized include BitTorrent, Bluetooth Bootstrap Protocol ("BOOTP"), Domain Name System ("DNS"), Dynamic Host Configuration Protocol ("DHCP"), Ethernet, file transfer protocol ("FTP"), hypertext transfer protocol ("HTTP"), infrared communication standards (e.g., IrDA or IrSimple), transmission control protocol/internet protocol ("TCP/IP") (e.g., any of the protocols used in each of the TCP/IP layers), real-time transport protocol ("RTP"), real-time streaming protocol ("RTSP"), Simple Mail Transfer Protocol ("SMTP"), Simple Network Management Protocol ("SNMP"), Simple Network Time Protocol ("SNTP"), secure shell protocol ("SSH"), and any other communications protocol or standard, or any combination thereof.

Communication Link. Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connections for transmission of light and (ii) wireless links such as wireless electromagnetic signals that carry information via changes made to one or more properties of electromagnetic waves.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Computer. Generally speaking, a computer or computing device is a programmable machine having two principal characteristics. Namely, it responds to a set of instructions in a well-defined manner and can execute a prerecorded list of instructions (e.g., a program or routine). A computer according to the present disclosure is a device with a processor and a memory. For purposes of this disclosure, examples of a computer include a server host, a personal computer, (e.g., desktop computer, laptop computer, netbook), a mobile communications device (such as a mobile "smart" phone), and devices providing functionality through internal components or connection to an external computer, server, or global communications network (such as the Internet) to take direction from or engage in processes which are then delivered to other system components.

Database. Generally speaking, a "database" is an organized collection of data, generally stored and accessed electronically from a computer system. Generally, any suitable datastore may be referred to as a "database." This disclosure may describe one or more databases for storing information relating to aspects of the disclosure. The information stored on a database can, for example, be related to a private subscriber, a content provider, a host, a security provider, etc. A server (which may or may not be hosted on the same computer as the database) may act as an intermediary between the database and a client by providing data from the database to the client or enabling the client to write data to the database. One of ordinary skill in the art appreciates any reference to "a database" my refer to multiple databases, each of which may be linked to one another.

Display Device. Generally speaking, the terms "display device" or "display" refer to an electronic visual display device that provides visual output in the form of images, text, or video. Typically, a display device may be any display, screen, monitor, or projector suitable for displaying visual output (e.g., images or video output). Example displays include LED screens, LCD screens, CRT screens, projectors, heads-up displays, smart watch displays, headset displays (e.g., VR goggles), etc.

Graphic User Interface (GUI). See "User Interface."

Input/Output (I/O) Interface. Generally speaking, an I/O interface of a computer system is a hardware component (e.g., an I/O controller installed on a motherboard) that communicatively connects one or more processors of the computer system to one or more input or output devices such as UI device or peripheral devices. The I/O interface may receive input and output requests from a system processor, and may then send device-specific control signals to controlled devices based on the requests. The I/O interface may also receive data, requests, or commands from connected devices that are then transmitted to system processors. I/O interfaces are sometimes called device controllers. The software on a system that interacts with a device controller and that enables the device controller to control or otherwise communicate with a particular device is generally referred to as a "device driver."

Machine-Learning. Generally speaking, machine-learning is a method of data analysis that automates analytical model building. Specifically, machine-learning generally refers to the algorithms and models that computer systems use to effectively perform a specific task without using explicit instructions, relying on patterns and inference instead. Machine-learning algorithms learn through a process called induction or inductive learning. Induction is a reasoning process that makes generalizations (a model) from specific information (training data).

Generalization is required because the model that is prepared by a machine-learning algorithm needs to make predictions or decisions based on specific data instances that were not seen during training. Note, a model may suffer from over-learning or under-learning.

Over-learning occurs when a model learns the training data too closely and does not generalize. The result is poor performance on data other than the training dataset. This is also called over-fitting.

Under-learning occurs when a model has not learned enough structure from the training data because the learning process was terminated early. The result is good generalization but poor performance on all data, including the training dataset. This is also called under-fitting.

Depending on the implementation, a model may implement supervised learning or unsupervised learning. Supervised learning is a learning process for generalizing on problems where a prediction is required. A "teaching process" compares predictions by the model to known answers and makes corrections in the model. Unsupervised learning is a learning process for generalizing the structure in the data where no prediction is required. Natural structures are identified and exploited for relating instances to each other.

Memory and Computer-Readable Media. Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Module. When used in the context of a software system, the term "module" generally refers to a set of applications, routines, or executable instructions. See "Routine." In some instances, the term "module" refers to a component of a physical system (e.g., a car includes a number of modules, such as an engine, transmission, brakes, etc.). The context of the use of the term will make clear whether the "module" refers to a software component or non-software component.

Network. As used herein and unless otherwise specified, when used in the context of system(s) or device(s) that communicate information or data, the term "network" refers to a collection of nodes (e.g., devices or systems capable of sending, receiving or forwarding information) and links which are connected to enable telecommunication between the nodes.

A network may include dedicated routers, switches, or hubs responsible for forwarding directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. A network may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Object. Generally speaking, the term "object" when used in the context of a software system refers to a variable, a data structure, a function, a method, an instance of a class or template, or some combination thereof. An object is typically referenceable by a unique or relatively unique identifier.

Processor. The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chip set is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Routine. Unless otherwise noted, a "routine," "module," or "application" described in this disclosure refers to a set of computer-readable instructions that may be stored on a CRM. For example the server routine 105 and the client module routine 106 are each routines that may be stored on a CRM. Generally, a CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

Further, unless otherwise stated, each routine or application may be embodied as: (i) a stand-alone software program, (ii) a module or sub-module of a software program, (iii) a routine or sub-routine of a software program, or (iv) a resource invoked or accessed by a software program via a "call" to thereby cause the system to implement the task or function associated with the resource.

Each routine may be represented by code implemented in any desired language, such as source code (e.g., interpretable for execution or compilable into a lower level code), object code, bytecode, machine code, microcode, or the like. The code may be written in any suitable programming or scripting language (e.g., C, C++, Java, Actionscript, Objective-C, Javascript, CSS, Python, XML, Swift, Ruby, Elixir, Rust, Scala, or others).

Server. Generally speaking, a server is a program or set of routines that manages network resources or services to provide functionality for other programs or devices called "clients." Servers are typically hosted by a host computer, and this host computer may itself be referred to as a "server." Example servers include database servers, file servers, mail servers, print servers, web servers, game servers, and application servers. Servers may be dedicated (e.g., wherein the software and hardware are used exclusively or nearly exclusively for server functions) or virtual (e.g., wherein the server is hosted by a virtual machine on a physical machine and/or wherein the server shares hardware or software resources of a single machine with another operating system).

User Interface (UI). Generally speaking, a user interface refers to the components of a computer system by which a user and the computer system interact. The UI components may be hardware, software, or some combination thereof, and may include UI input components, UI output components, or some combination thereof.

Example UI output components include: (i) visual output components such as lights (e.g., LEDs) and electronic displays (e.g., LCD, LED, CRT, plasma, projection displays, heads-up displays, etc.), (ii) audio output components such as speakers, and (iii) motion generating components such as motors that provide haptic feedback.

Example UI input components include: (i) mechanical or electrical components for detecting physical or touch input, such as hardware actuators (e.g., those used for a keyboard, a mouse, "hard" buttons found on a tablet or phone, etc.) or electrical sensors (e.g., resistive or capacitive touch sensors); (ii) audio sensors (e.g., microphones) for detecting audio input, such as voice commands; (iii) image sensors for detecting image or video input, such as those found in a camera (e.g., enabling facial recognition input or gesture input without requiring the user to touch the device); and (iv) motion sensors (e.g., accelerometers, gyroscopes, etc.) for detecting motion of the computer system itself (e.g., enabling a user to provide input by rotating or otherwise moving the computer system).

Some systems provide a graphical user interface (GUI) by way of a UI output component such as an electronic display. Generally speaking, a GUI is generated via a routine and enables a user to interact with indicators and other graphic elements displayed on at the electronic display. Generally speaking, the graphic elements of a GUI may be output elements (i.e., conveying some sort of information to the user), control elements (i.e., being user "interactable" to cause the execution of an action by the system), or both (e.g., an icon may include an image representing a browser and may be interacted with to launch the browser).

Example GUI control elements include buttons (e.g., radio buttons, check boxes, etc.), sliders, list boxes, spinner elements, drop-down lists, menus, menu bars, toolbars, interactive icons, text boxes, windows that can be moved or minimized and maximized, etc.

Generally speaking, a window is an area on the screen that displays information, with its contents being displayed independently from the rest of the screen. Generally, a menu is a list of selectable choices that a user may select to execute a corresponding command (e.g., to cause the menu to expand and display additional choices, to cause a new window to be generated, etc.). Generally, an icon is small image representing an object such as a file, an application, a web page, or a command. A user can typically interact with an icon (e.g., by single or double pressing or clicking) to execute a command, open a document, or run an application.

What is claimed is:

1. A system for configuring machine-learning services, the system comprising:
   a display;
   one or more processors coupled to the display;
   one or more memories, coupled to the one or more processors, storing:
   (1) a plurality of preconfigured data templates, each template of the plurality of preconfigured data templates having a respective association requirement;
   (2) a set of instructions that, when executed, causes the one or more processors to:
   select a template from the plurality of preconfigured data templates, the template having an association requirement and a set of template configurations;
   identify at least one of a data source, a data destination, or a data manipulation machine learning (ML) model that satisfies the association requirement of the template;
   display a graphical user interface (GUI) including a canvas area configured to receive input from the user, the canvas area including one or more selectable icons representing the at least one of the data source, the data destination, or the data manipulation ML model;
   receive a first input from the user via the one or more selectable icons, the first input indicating a selection of a first one of the at least one of the data source, the data destination, or the data manipulation ML model;
   receive a second input from the user, via the canvas area and corresponding to the selection, indicating a permissible use of the first one of the at least one of the data source, the data destination, or the data manipulation ML model;
   modify the set of template configurations, based at least in part on the first input and the second input, to create a set of modified template configurations, wherein modifying the set of template configurations includes generating an association between the template and the first one of the at least one of the data source, the data destination, or the data manipulation ML model, the set of modified template configurations including the association and being formatted in accordance with the permissible use;
   receive a third input from the user via the GUI;
   instantiate a workflow object based on the third input, the workflow object including the template and the set of modified template configurations wherein the third input comprises natural language audio input received via a tool associated with the GUI; and implement the workflow object in accordance with the set of modified template configurations, wherein implementing the workflow object includes:

retrieving data from a first data source that satisfies the association requirement;

executing a first data manipulation ML model that satisfies the association requirement using the retrieved data, wherein executing the first data manipulation ML model includes training the first data manipulation ML model based on objects displayed in the GUI that are dragged by the user onto the canvas area, generating execution results wherein the execution results indicate one of estimated repair costs for damage to property, a severity of a weather event and an underwriting decision for an insurance policy, storing the execution results in a first data destination that satisfies the association requirement, displaying, via the GUI, execution results generated by the workflow object and the first data manipulation ML model, receiving fourth input from a user that annotates the displayed execution results, and sharing, in response to user interaction with the GUI, the annotated execution results with an external client device.

2. The system of claim 1, wherein the first one of the at least one of the data source, the data destination, or the data manipulation ML model comprises the data source, and wherein the permissible use includes a network address for the first data source.

3. The system of claim 1, wherein the first one of the at least one of the data source, the data destination, or the data manipulation ML model comprises the data source, and wherein the permissible use comprises use of data received from the data source for at least one of training data, validation data, or testing data.

4. The system of claim 1, wherein the preconfigured data templates include: an application programming interface (API) for a datastore type represented by the first data source.

5. The system of claim 1, wherein the set of instructions further causes the one or more processors to receive a fourth input from the user that causes a placement in the canvas area of a link graphic connecting a first icon representing the first data source to a second icon representing the first data manipulation ML model template.

6. The system of claim 1,
wherein the set of instructions further causes the one or more processors to:
(i) detect a placement in the canvas area of a first icon, selected from the one or more selectable icons, representing a second data destination;
(ii) detect a fourth input from the user via the GUI that:
(a) modifies the set of template configurations to create a second set of template configurations; and
(b) indicates that the second data destination is a data destination for predictive results generated by the first data manipulation ML model; and
(iii) instantiate a second workflow object such that the second workflow object inherits the second set of template configurations.

7. A method for configuring machine-learning services, the method comprising:

storing, by one or more memories, a plurality of preconfigured data templates, each template of the plurality of preconfigured data templates having a respective association requirement;

selecting, via one or more processors, a template from the plurality of preconfigured data templates, the template having an association requirement and a set of template configurations;

identifying, via the one or more processors, at least one of a data source, a data destination, or a data manipulation machine learning (ML) model that satisfies the association requirement of the template;

displaying, via the one or more processors, a graphical user interface (GUI) including a canvas area configured to receive input from the user, the canvas area including one or more selectable icons representing the at least one of a data source, the data destination, or the data manipulation machine learning (ML) model;

receiving, via the one or more processors, a first input from the user via the one or more selectable icons, the first input indicating a selection of a first one of the at least one of the data source, the data destination, or the data manipulation ML model;

receiving, via the one or more processors, a second input from the user, via the canvas area and corresponding to the selection, indicating a permissible use of the first one of the at least one of the data source, the data destination, or the data manipulation ML model;

modifying, via the one or more processors, the set of template configurations, based at least in part on the first input and the second input, to create a set of modified template configurations, wherein modifying the set of template configurations includes generating an association between the template and the first one of the at least one of the data source, the data destination, or the data manipulation ML model, the set of modified template configurations including the association and being formatted in accordance with the permissible use, receiving, via the one or more processors, a third input from the user via the GUI;

instantiating, via the one or more processors, a workflow object based on the third input, the workflow object including the template and the set of modified template configurations wherein the third input comprises natural language audio input received via a tool associated with the GUI; and implementing the workflow object in accordance with the set of modified template configurations, wherein implementing the workflow object includes:

retrieving data from a first data source that satisfies the association requirement;

executing a first data manipulation ML model that satisfies the association requirement using the retrieved data, wherein executing the first data manipulation ML model includes:

training the first data manipulation ML model based on objects displayed in the GUI that are dragged by the user onto the canvas area, generating execution results wherein the execution results indicate one of estimated repair costs for damage to property, a severity of a weather event and an underwriting decision for an insurance policy, storing the execution results in a first data destination that satisfies the association requirement, displaying, via the GUI, execution results generated by the workflow object and the first data manipulation ML model, receiving fourth input from a user that annotates the displayed execution results, and sharing, in response to user interaction with the GUI, the annotated execution results with an external client device.

8. The method of claim 7, wherein the first one of the at least one of the data source, the data destination, or the data manipulation ML model comprises the data source, and wherein the permissible use includes a network address for the first data source.

9. The method of claim 7, wherein the first one of the at least one of the data source, the data destination, or the data manipulation ML model comprises the data source, and wherein the permissible use comprises use of data received from the data source for at least one of training data, validation data, or testing data.

10. The method of claim 7, wherein the preconfigured data templates include: an application programming interface (API) for a datastore type represented by the first data source.

11. The method of claim 7, the method further comprising receiving a fourth input from that causes a placement in the canvas area of a link graphic connecting a first icon representing the first data source to a second icon representing the first data manipulation ML model template.

12. The method of claim 7,
wherein the method further includes:
(i) detecting a placement in the canvas area of a first icon, selected from the one or more selectable icons, representing a second data destination;
(ii) detecting a fourth input from the user via the GUI that: (a) modifies the set of template configurations to create a second set of template configurations; and (b) indicates that the second data destination is a data destination for predictive results generated by the first data manipulation ML model; and
(iii) instantiating a second workflow object such that the second workflow object inherits the second set of template configurations.

13. The method of claim 7,
wherein the method further includes:
(i) detecting a placement in the canvas area of a first icon, selected from the one or more selectable icons, representing a second data source;
(ii) detecting a fourth input from the user via the GUI that: (a) modifies the set of template configurations to create a second set of template configurations; and (b) indicates that the second data source is a data source for input data to be fed to the first data manipulation ML model to generate predictive results; and
(iii) instantiating a second workflow object such that the second workflow object inherits the second set of template configurations.

14. The method of claim 7, wherein the first data manipulation ML model represents one of the following types: a k-nearest neighbors (KNN) model; and a neural network model, or a logistic regression model.

15. The method of claim 7, wherein the first data manipulation ML model represents one of the following types: a linear discriminant analysis (LDA) model; a classification and regression tree model; a naïve bayes model; a learning vector quantization (LVQ) model; a support vector machine (SVM) model; or a bagging and random forest model.

16. A non-transitory computer-readable storage medium storing processor-executable instructions that, when executed, cause one or more processors to:

store, by one or more memories, a plurality of preconfigured data templates, each template of the plurality of preconfigured data templates having a respective association requirement;

select, via one or more processors, a template from the plurality of preconfigured data templates, the template having an association requirement and a set of template configurations;

identify, via the one or more processors, at least one of a data source, a data destination, or a data manipulation machine learning (ML) model that satisfies the association requirement of the template;

display, via the one or more processors, a graphical user interface (GUI) including a canvas area configured to receive input from the user, the canvas area including one or more selectable icons representing the at least one of a data source, the data destination, or the data manipulation machine learning (ML) model;

receive, via the one or more processors, a first input from the user via the one or more selectable icons, the first input indicating a selection of a first one of the at least one of the data source, the data destination, or the data manipulation ML model;

receive, via the one or more processors, a second input from the user, via the canvas area and corresponding to the selection, indicating a permissible use of the first one of the at least one of the data source, the data destination, or the data manipulation ML model;

modify, via the one or more processors, the set of template configurations, based at least in part on the first input and the second input, to create a set of modified template configurations, wherein modifying the set of template configurations includes generating an association between the template and the first one of the at least one of the data source, the data destination, or the data manipulation ML model, the set of modified template configurations including the association and being formatted in accordance with the permissible use, receive, via the one or more processors, a third input from the user via the GUI;

instantiate, via the one or more processors, a workflow object based on the third input, the workflow object including the template and the set of modified template configurations wherein the third input comprises natural language audio input received via a tool associated with the GUI; and implement the workflow object in accordance with the set of modified template configurations, wherein implementing the workflow object includes:
retrieving data from a first data source that satisfies the association requirement;
executing a first data manipulation ML model that satisfies the association requirement using the retrieved data, wherein executing the first data manipulation ML model includes:
training the first data manipulation ML model based on objects displayed in the GUI that are dragged by the user onto the canvas area,
generating execution results wherein the execution results indicate one of estimated repair costs for damage to property, a severity of a weather event and an underwriting decision for an insurance policy,
storing the execution results in a first data destination that satisfies the association requirement, displaying, via the GUI, execution results generated by the workflow object and the first data manipulation ML model, receiving fourth input from a user that annotates the displayed execution results, and sharing, in response to user interaction with the GUI, the annotated execution results with an external client device.

17. The non-transitory computer-readable storage medium of claim 16, wherein the first data manipulation ML model comprises one of the following types: a linear discriminant analysis (LDA) model; a classification and regression tree model; a naïve bayes model; a learning vector quantization (LVQ) model; a k-nearest neighbors (KNN) model; a support vector machine (SVM) model; a neural network model; a logistic regression model; or a bagging and random forest model.

18. The non-transitory computer-readable storage medium of claim 16, wherein the GUI includes an application programming interface (API) for the first data source.

* * * * *